United States Patent
Spahic et al.

(10) Patent No.: US 10,840,705 B2
(45) Date of Patent: Nov. 17, 2020

(54) CONVERTER CONFIGURATION

(71) Applicant: SIEMENS AKTIENGESELLSCHAFT, Munich (DE)

(72) Inventors: Ervin Spahic, Erlangen (DE); Kilian Dallmer-Zerbe, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 344 days.

(21) Appl. No.: 15/895,133

(22) Filed: Feb. 13, 2018

(65) Prior Publication Data
US 2018/0233912 A1    Aug. 16, 2018

(30) Foreign Application Priority Data
Feb. 13, 2017    (DE) .................... 10 2017 202 204

(51) Int. Cl.
*H02J 3/16*    (2006.01)
*H02J 7/00*    (2006.01)
(Continued)

(52) U.S. Cl.
CPC .............. *H02J 3/16* (2013.01); *H02J 7/0014* (2013.01); *H02M 7/483* (2013.01); *H02M 7/797* (2013.01);
(Continued)

(58) Field of Classification Search
CPC ............ H02J 3/16; H02J 7/0014; H02J 7/345; H02M 7/483; H02M 7/797; H02M 2007/4835
(Continued)

(56) References Cited

U.S. PATENT DOCUMENTS 7,436,150 B2 * 10/2008 Daboussi .............. H02J 7/0016
                                                                320/118
8,228,044 B2 *  7/2012 Kotz .......................... B60L 7/10
                                                                320/166
(Continued)

FOREIGN PATENT DOCUMENTS

DE    102010022043 A1    12/2011
WO       2007102758 A1     9/2007
(Continued)

*Primary Examiner* — M Baye Diao
(74) *Attorney, Agent, or Firm* — Laurence Greenberg; Werner Stemer; Ralph Locher

(57) ABSTRACT

A converter configuration has a converter. The AC voltage side of which can be connected to an AC voltage grid and the DC voltage side of which can be connected to a storage configuration. The converter has a plurality of converter arms, which each have a series circuit of semiconductor switching modules, and the storage configuration is arranged in parallel with at least one of the converter arms. The storage configuration contains a multiplicity of series circuits of individual energy storage modules. Each series circuit extends between a first and a second DC voltage busbar such that the series circuits are connected in parallel with one another. The converter configuration further has a balancing apparatus for balancing energy storage module voltages of the energy storage modules. The balancing apparatus contains balancing lines, which connect individual energy storage modules of different series circuits to one another.

11 Claims, 3 Drawing Sheets

(51) Int. Cl.
  *H02M 7/797* (2006.01)
  *H02M 7/483* (2007.01)
  *H02J 7/34* (2006.01)
(52) U.S. Cl.
  CPC ...... *H02J 7/345* (2013.01); *H02M 2007/4835* (2013.01)
(58) Field of Classification Search
  USPC ......................................................... 320/166
  See application file for complete search history.

(56) References Cited

U.S. PATENT DOCUMENTS

| | | | | |
|---|---|---|---|---|
| 9,048,691 | B2* | 6/2015 | Crane | H02J 3/36 |
| 9,209,653 | B2* | 12/2015 | Maynard | H02J 7/0016 |
| 9,620,968 | B2* | 4/2017 | Sugeno | H02J 7/0019 |
| 9,669,723 | B2* | 6/2017 | Sugeno | B60L 11/1851 |
| 9,853,461 | B2* | 12/2017 | Kubota | H02J 7/0014 |
| 9,979,210 | B2* | 5/2018 | Takao | H02J 7/0016 |
| 10,027,134 | B2* | 7/2018 | Mei | H02J 7/0047 |
| 10,248,148 | B2* | 4/2019 | Dommaschk | H02M 5/45 |
| 10,479,204 | B2* | 11/2019 | Murai | H02J 7/0014 |
| 10,498,145 | B2* | 12/2019 | Gagneur | H02J 7/0014 |
| 2004/0212352 | A1* | 10/2004 | Anzawa | H02M 1/08 320/166 |
| 2004/0228055 | A1* | 11/2004 | Pearson | H01M 16/006 361/93.1 |
| 2006/0221516 | A1* | 10/2006 | Daboussi | H02M 3/1582 361/18 |
| 2008/0309295 | A1* | 12/2008 | Kotz | B60L 53/14 320/167 |
| 2011/0003182 | A1 | 1/2011 | Zhu | |
| 2013/0122341 | A1 | 5/2013 | De Paoli et al. | |
| 2013/0148392 | A1* | 6/2013 | Inoue | H02M 7/483 363/68 |
| 2013/0200849 | A1* | 8/2013 | Crebier | H02M 3/1582 320/116 |
| 2014/0009092 | A1* | 1/2014 | Ma | H02J 50/10 318/139 |
| 2014/0042980 | A1 | 2/2014 | Floros et al. | |
| 2014/0287278 | A1 | 9/2014 | Despesse | |
| 2015/0107824 | A1* | 4/2015 | Signorelli | E21B 41/0085 166/244.1 |
| 2015/0295424 | A1* | 10/2015 | Suzuki | H02J 7/0014 320/116 |
| 2016/0134200 | A1* | 5/2016 | Hyttinen | H02M 7/003 363/123 |
| 2017/0033708 | A1* | 2/2017 | Elserougi | H02H 7/1257 |
| 2017/0170658 | A1 | 6/2017 | Tengner et al. | |
| 2017/0207631 | A1* | 7/2017 | Helling | H02J 7/00 |
| 2018/0159422 | A1* | 6/2018 | Kikuchi | H02M 1/32 |
| 2018/0205238 | A1* | 7/2018 | Uno | H02J 7/0024 |
| 2019/0207533 | A1* | 7/2019 | Kikuchi | H02M 7/797 |

FOREIGN PATENT DOCUMENTS

| | | |
|---|---|---|
| WO | 2011003251 A1 | 1/2011 |
| WO | WO2011147927 A1 | 12/2011 |
| WO | 2015124176 A1 | 8/2015 |

\* cited by examiner

CONVERTER CONFIGURATION

CROSS-REFERENCE TO RELATED APPLICATION

This application claims the benefit, under 35 U.S.C. § 119, of German patent application DE 10 2017 202 204.3, filed Feb. 13, 2017; the prior application is herewith incorporated by reference in its entirety.

BACKGROUND OF THE INVENTION

Field of the Invention

The invention relates to a converter configuration having a converter, the AC voltage side of which can be connected to an AC voltage grid, and having a storage configuration to which the DC voltage side of the converter can be connected.

Such a converter configuration is known from international patent disclosure WO 2007/102758 A1. The document describes a power compensation installation that can exchange both reactive power and active power with the AC voltage grid. The known power compensation installation contains a converter, which is also referred to as a STATCOM (Static Var Compensator), the AC voltage side of which is connected to the AC voltage grid by a transformer. A capacitance is arranged in a parallel circuit with the DC voltage side of the converter. The power compensation installation further contains a storage configuration in the form of batteries, which are arranged in a series circuit in parallel with the capacitance.

Exchanging the active power between the energy storage module and the AC voltage grid can influence the frequency in the AC voltage grid. If the AC voltage grid is, for example, an energy supply grid, the fundamental frequency of an AC voltage in the AC voltage grid is usually 50 Hz or 60 Hz. This frequency is intended to remain as constant as possible over time. However, the frequency can also be subject to temporary fluctuations, for example on account of a changed power consumption by connected loads and/or a changed power delivery by connected sources. The frequency can be stabilized by virtue of the compensation installation being induced to draw the active power in the event of an increase in frequency in the AC voltage grid (overfrequency) and being induced to deliver the active power in the event of a decrease in frequency (underfrequency).

U.S. patent publication No. 2013/0122341 A1 discloses a storage configuration in which individual energy storage modules are connected in a series circuit and a plurality of such series circuits are connected in parallel. Connecting a plurality of energy storage modules in a series circuit can increase the voltage of the storage configuration that can be reached. Connecting the series circuits in parallel with one another can increase the ability of the storage configuration to draw power or to deliver power.

During operation of the storage configuration, it is important for the individual energy storage modules to always have identical electrical properties. For example, deviations in the capacitance of the energy storage modules among one another lead to different energy storage module voltages at the energy storage modules, which is also referred to as imbalance. The imbalance limits the usability of the storage configuration.

In the low-voltage range, active balancing devices that are used to eliminate imbalance by actively balancing the energy storage module voltages are known. However, the range of use of the known balancing devices is restricted to the low-voltage range. The balancing devices therefore cannot be used in the converter configuration of the generic type because the energy storage modules are dimensioned for voltages above 1 kV. In addition, active balancing devices, that is to say balancing devices connected to a regulation system, are relatively costly.

SUMMARY OF THE INVENTION

The object of the invention consists in proposing a converter configuration of the generic type that is as cost-effective as possible and makes a high usability of the storage configuration possible.

In a converter configuration of the generic type, the object is achieved in accordance with the invention by virtue of the converter having a plurality of converter arms, which each have a series circuit of semiconductor switching modules. The storage configuration is arranged in parallel with at least one of the converter arms, wherein the storage configuration has a multiplicity of storage branches, which each contain a series circuit of individual energy storage modules. Each storage branch extends between a first and a second DC voltage busbar such that the storage branches are connected in parallel with one another, wherein the converter configuration further contains a balancing apparatus for balancing energy storage module voltages of the energy storage modules. The balancing apparatus contains balancing lines, which connect individual energy storage modules of different storage branches to one another. The first DC voltage busbar can be a positive DC voltage busbar, for example; the second DC voltage busbar can be a negative DC voltage busbar. If the converter has a double-star configuration, described further below, the two DC voltage busbars can each be connected to one of the star points of the double-star configuration.

Charge compensation between the energy storage modules of different storage branches or series circuits can therefore be achieved by the balancing apparatus. In this way, the imbalance can advantageously be eliminated or at least reduced. The compensation currents, which lead to balancing of the energy storage modules, flow in this case via the balancing lines. The balancing apparatus of the converter configuration according to the invention is also relatively cost-effective and simple to construct.

The balancing apparatus is expediently purely passive. This means that the balancing apparatus does not contain a regulation operation or data transmission operation between the energy storage modules. The compensation between the energy storage modules can be effected, for example, automatically by way of the balancing voltages, without further measures. The balancing apparatus is therefore particularly simple to construct and operate. In addition, a passive balancing apparatus operates substantially without a delay, which could arise, for example, on account of a data transmission operation between the energy storage modules.

In contrast to operating current paths of the converter configuration, during operation of the converter configuration, the balancing lines do not carry high currents in the range of 1 kA and more. It can therefore be advantageous and sufficient for the balancing lines to be dimensioned for compensation currents, which, during operation of the converter configuration, can flow on account of capacitance differences between the energy storage modules of different storage branches. These compensation currents are substantially lower than the operating currents. The capacitance differences result in relatively small voltage differences, which in turn also cause relatively low compensation currents in the range of at most a few amperes. The balancing lines can therefore be configured in a correspondingly simple and cost-effective manner. In particular, the balancing lines can be embodied as cables or busbars. In this case, the cross section of the balancing lines can be selected to be significantly smaller.

Preferably, an ordinal number can be assigned to each of the energy storage modules based on the remaining energy storage modules of the same series circuit or of the same storage branch and the balancing lines each connect energy storage modules of the same ordinal number to one another. For example, the energy storage module nearest to the positive DC voltage busbar can receive the lowest ordinal number. The adjacent energy storage module in the same storage branch then receives the next highest ordinal number and so on. In this way, a natural number can be assigned as an ordinal number to each energy storage module. In this way, those energy storage modules that are at least approximately at the same electrical potential can be connected in each case by the balancing lines.

Each storage branch expediently contains the same number of energy storage modules. In this case, the number of balancing lines corresponds to the number of energy storage modules in each storage branch. Alternatively, the number of balancing lines can also be lower than the number of energy storage modules in a storage branch. For example, a plurality of energy storage modules can be built-in with one another in a tower, wherein a plurality of towers connected in a series circuit form the series circuit of the storage branch, which extends between the positive and negative DC voltage busbars. Each of the towers can in this case have a positive and a negative connection. In accordance with this variant, the balancing lines connect the positive or the negative connections of the towers. More generally, each storage branch can have a number n*m of energy storage modules, wherein the nth energy storage modules, the 2*nth energy storage modules, the 3*nth energy storage modules, and so on, are connected to one another by means of the balancing lines.

The individual energy storage modules preferably contain so-called supercaps, which are also referred to as supercapacitors. Storage elements of this kind have a particularly high power density, with the result that they can be charged and discharged particularly quickly. Alternatively to or in combination with this, the energy storage modules can also contain battery stores.

Since voltages of over 100 kV are usually used in the AC voltage grid, it is considered to be advantageous when the energy storage modules can establish a voltage of more than 1 kV at the terminals of the energy storage modules or a voltage of more than 1 kV can be generated at the terminals of the energy storage modules. A correspondingly high total voltage can be achieved by the series circuit of the energy storage modules.

In accordance with one embodiment of the invention, the energy storage modules each have a positive and a negative connection terminal, wherein each of the balancing lines connects the positive or the negative connection terminals of the energy storage modules. In this way, the balancing lines can also be built into the storage configuration retrospectively, which makes it possible to retrofit existing storage configurations without a balancing apparatus. The corresponding connection terminals are preferably mechanically and electrically configured to carry both the respective power supply line inside the storage branch and the balancing line.

The semiconductor switching modules expediently contain intermediate capacitors, which can also be referred to as link capacitors. In this way, the converter configuration is enhanced for reactive power compensation in the AC voltage grid. The intermediate capacitors of the semiconductor switching modules are not provided for exchanging active power between the converter configuration and the AC voltage grid.

In accordance with one embodiment of the invention, the semiconductor switching modules each contain semiconductor switches and an intermediate capacitor, which are connected to one another in a full-bridge module circuit. A full-bridge module circuit is characterized in that two series circuits of two semiconductor switches are connected in parallel, wherein the intermediate capacitor is arranged in parallel with the series circuits of the semiconductor switches. The full-bridge module circuit has two connection terminals, one of which is arranged with a potential point between the semiconductor switches of the one series circuit and the other is arranged with a potential point between the semiconductor switches of the other series circuit. A capacitor voltage dropped across the intermediate capacitor, a zero voltage or else the inverse capacitor voltage can be generated at the connection terminals of the semiconductor switching module.

The converter configuration is expediently configured to exchange active power between the storage configuration and an AC voltage grid, the AC voltage side of which is connected to the converter configuration, by suitable actuation of the semiconductor switching modules by a control device. The converter configuration is therefore suitable, for example, for contributing to frequency stabilization in the AC voltage grid.

The converter configuration is suitably further configured to exchange reactive power between the semiconductor switching modules and an AC voltage grid, the AC voltage side of which is connected to the converter configuration, by suitable actuation of the semiconductor switching modules by a control device. The converter configuration can therefore be used to further stabilize the AC voltage grid by reactive power compensation.

With the series circuit of semiconductor switching modules, the converter is a so-called modular multi-level converter (MMC). The semiconductor switches of the semiconductor switching modules of the MMC can be actuated independently of one another, as a result of which the MMC can generate a stepped AC voltage having an approximately arbitrary temporal profile. In accordance with one embodiment of the invention, the converter arms of the converter are connected to one another in a double-star configuration. The double-star configuration is characterized by the following structure. The converter contains three converter phases each having two converter arms. Each converter phase extends between a positive and a negative DC voltage pole of the converter configuration, the converter phases likewise being connected to the first, or positive, and to the second, or negative, DC voltage busbar. The converter arms of a single converter phase are connected to one another in series, wherein one AC voltage connection for connecting the converter to an associated phase of the AC voltage grid is arranged in each case between the converter arms. The storage configuration is connected in parallel with the converter phases between the positive and the negative DC voltage pole.

Other features which are considered as characteristic for the invention are set forth in the appended claims.

Although the invention is illustrated and described herein as embodied in a converter configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
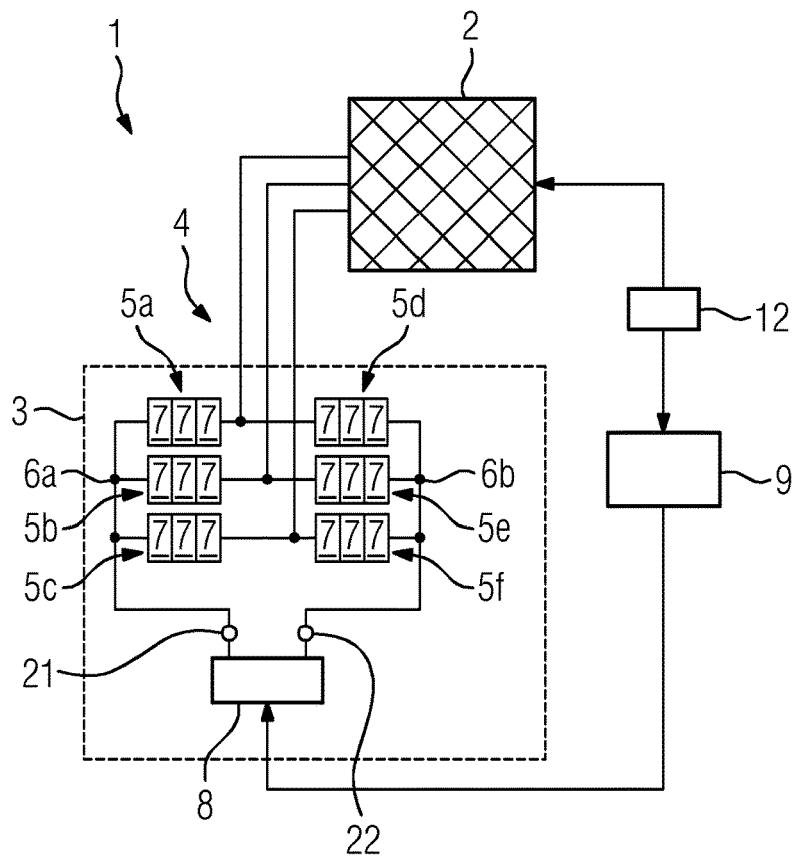
FIG. 1 is a schematic illustration of an exemplary embodiment of a converter configuration according to the invention.

Referring now to the figures of the drawings in detail and first, particularly to FIG. 1 thereof, there is shown a converter configuration 1 for stabilizing an AC voltage grid 2. The converter configuration 1 contains a converter 3, which has an AC voltage connection 4 for connection to the AC voltage grid 2. The AC voltage side of the converter 3 can thus be connected to the AC voltage grid 2. The converter contains six converter arms 5a-5f, which are connected to one another in a double-star circuit. The three converter arms 5a-c are connected to one another in a first star point 6a; the converter arms 5d-f are connected to one another in a second star point 6b.

Each converter arm 5a-f has a series circuit of semiconductor switching modules 7 (of identical design in the exemplary embodiment of FIG. 1). The following FIG. 4 deals with the design of the semiconductor switching modules 7 in more detail. In FIG. 1, only three semiconductor switching modules 7 are illustrated for reasons of clarity; however, the number of the semiconductor switching modules is, in principle, arbitrary and can be adapted to the respective application.

The converter configuration 1 further contains a storage configuration 8, which is arranged in parallel with the three converter phases of the converter 3. The storage configuration 8 contains a plurality of energy storage modules. The following FIGS. 2 and 3 deal with the design of the storage configuration 8 in more detail.

A control device 9 for controlling the converter configuration 1 permits control of the semiconductor switching modules 7 in such a way that an exchange of reactive and active power with the AC voltage grid 2 is made possible.

The voltage in the AC voltage grid 2 is 110 kV AC. A measuring device 12 is configured to measure the power in the AC voltage grid 2. The output side of the measuring device 12 is connected to the control device 9 such that the converter configuration 1 is regulated using the measured transmitted power. The power can be measured, for example, by current and voltage measurement.

Figure 2:
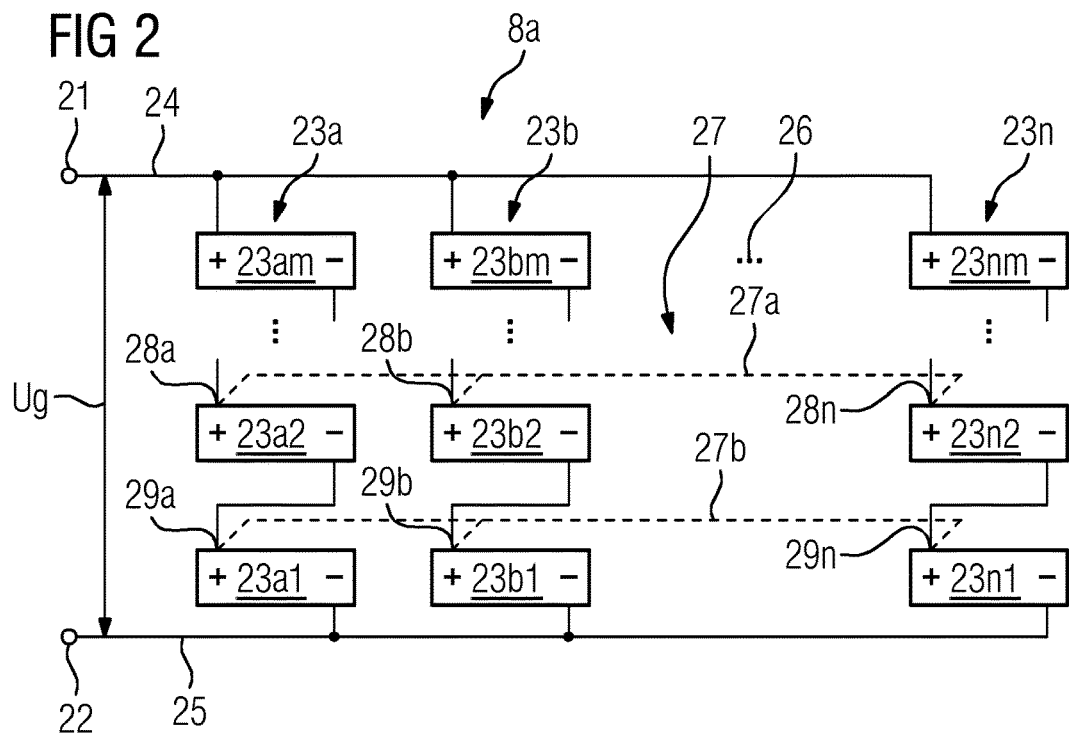
FIG. 2 is a block diagram of a first exemplary embodiment of a storage configuration.

FIG. 2 shows a storage configuration 8a, which can be used as a storage configuration 8 in the converter configuration 1 of FIG. 1. The storage configuration 8a has two connections 21, 22. The storage configuration 8a can be connected to the DC voltage side of the converter 3 of the converter configuration 1 of FIG. 1 by means of the connections 21, 22. The storage configuration 8a contains a multiplicity of storage branches 23a-n, which each extend between a positive DC voltage busbar 24 and a negative DC voltage busbar 25 and are each electrically connected thereto. FIG. 2 figuratively illustrates only three storage branches 23a, 23b, 23n for reasons of clarity. However, the number of the storage branches is, in principle, arbitrary within the context of the respective application, which is indicated by the dotted line 26.

Each storage branch 23a-n has a series circuit of m individual energy storage modules 23a1-m, 23b1-m, 23n1-m. The storage branches 23a-n are connected in parallel with one another. The number m of energy storage modules 23a1-23nm in each branch can be up to several hundred. In the example of FIG. 2, each of the energy storage modules has a voltage of 100 V. The total voltage Ug dropped across the terminals 21, 22 of the storage configuration 8a is 15 kV.

A purely passive balancing apparatus is provided to balance the energy storage module voltages dropped across the energy storage modules. The balancing apparatus contains balancing lines 27a, 27b. The balancing apparatus furthermore does not contain any active components in the sense of a regulating operation or a data transmission operation such that the balancing apparatus is purely passive. The balancing line 27a electrically connects positive connection terminals 28a-n of the energy storage modules 23a2-n2 to one another such that compensation currents can flow on account of different voltage levels at the energy storage modules 23a2-n2 via the balancing line 27a and can ensure elimination of the imbalance. It should be noted that the balancing line 27a connects energy storage modules 23a2-n2 having an identical ordinal number, in this case the ordinal number two, to one another. The balancing line 27b correspondingly electrically connects positive connection terminals 29a-n of the energy storage modules 23a1-n1 to one another such that compensation currents can flow on account of different voltage levels at the energy storage modules 23a1-n1 via the balancing line 27b and can ensure elimination of the imbalance. It should be noted that the balancing line 27b connects energy storage modules 23a1-n1 having an identical ordinal number, in this case the ordinal number one, to one another.

Further balancing lines, not illustrated graphically in FIG. 2, can connect further energy storage modules to one another.

Figure 3:
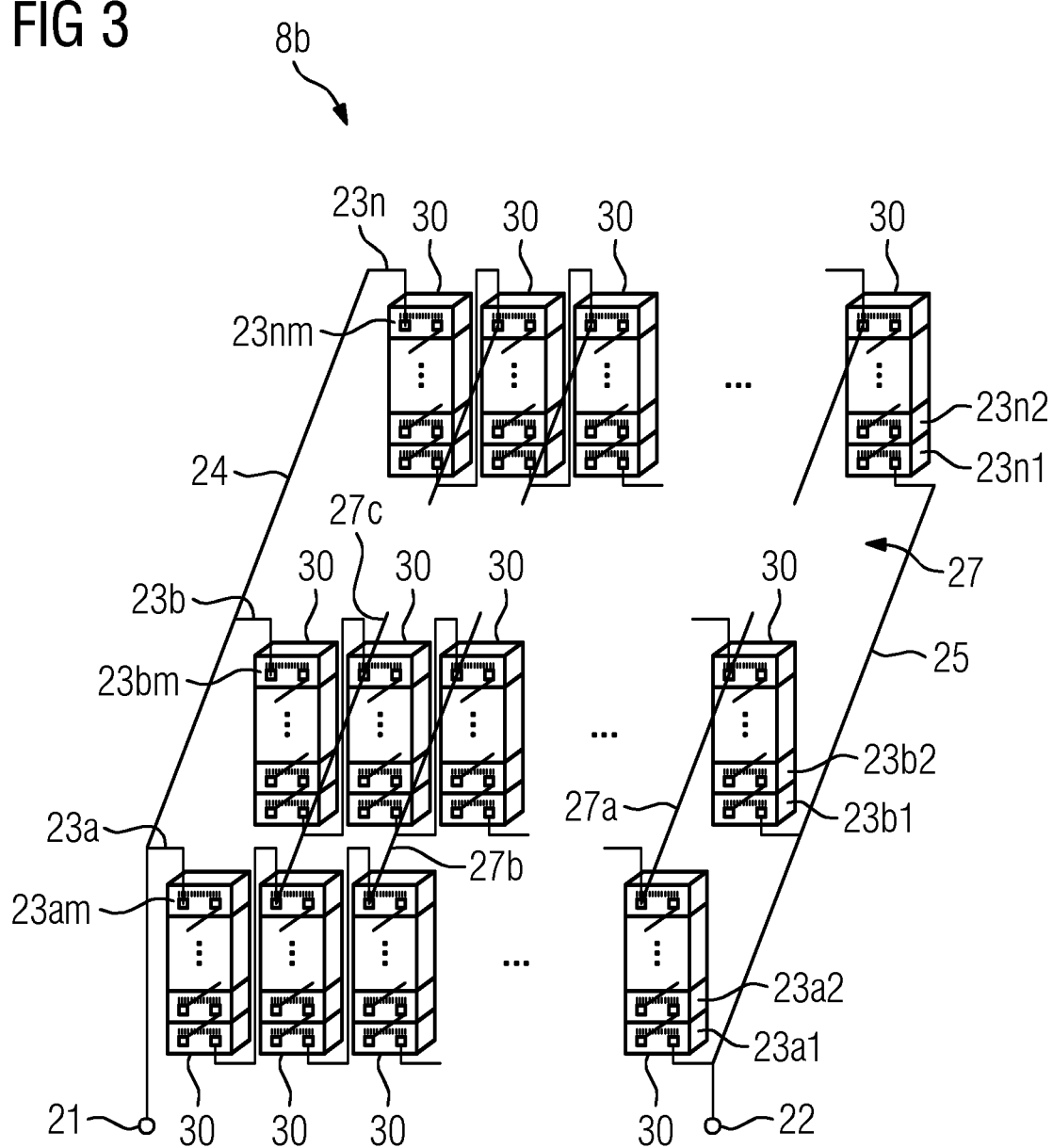
FIG. 3 is a perspective view of a second exemplary embodiment of a storage configuration.

FIG. 3 shows a storage configuration 8b, which can be used as a storage configuration 8 of the converter configuration 1 of FIG. 1. In principle, the design of the storage configuration 8b is similar to that of the storage configuration 8a. For reasons of clarity, identical and similar elements have been provided with identical reference signs in FIGS. 2 and 3.

In contrast to the storage configuration 8a of FIG. 2, the energy storage modules 23a1-nm of the storage configuration 8b are arranged in towers 30. In this case, each tower 30 can accommodate 5 to 50 energy storage modules 23a1-nm. The storage configuration 8b contains 100 to 200 towers 30.

The energy storage modules 23a1-nm each contain so-called supercapacitors. In the example of FIG. 3, the voltage dropped across the energy storage modules 23a1-nm is 125 V. The voltage at each tower can accordingly be 1.25 kV, for example, and the total voltage at the connections 21, 22 of the storage configuration can be 24 kV if ten energy storage modules are used per tower 30 and twenty towers are used in one storage branch 23a-n.

Balancing lines 27a-c connect electrically positive connection terminals of the towers 30 having an identical ordinal number to one another such that passive balancing of the energy store voltages is made possible as described above.

Figure 4:
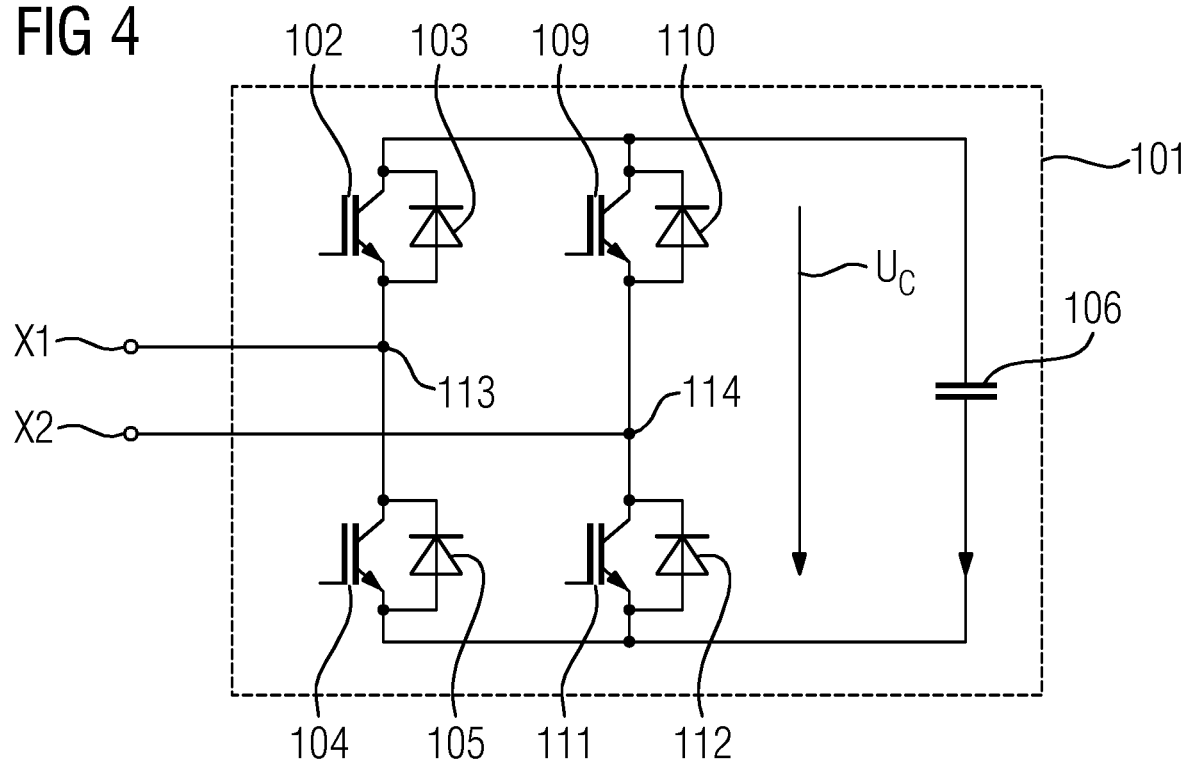
FIG. 4 is a circuit diagram of an example of a semiconductor switching module.

One example of a semiconductor switching module 7 in the form of a full-bridge module circuit 101 is schematically illustrated in FIG. 4. The full-bridge module circuit 101 has a first semiconductor switch 102 in the form of an IGBT, with which a freewheeling diode 103 is connected in anti-parallel, and a second semiconductor switch 104 in the form of an IGBT, with which a freewheeling diode 105 is connected in anti-parallel. The forward direction of the two semiconductor switches 102 and 104 is in the same direction. The full-bridge module circuit 101 further contains a third semiconductor switch 109 in the form of an IGBT, with which a freewheeling diode 110 is connected in anti-parallel, and a fourth semiconductor switch 111 in the form of an IGBT, with which a freewheeling diode 112 is connected in anti-parallel. The forward direction of the two semiconductor switches 109 and 111 is in the same direction. The semiconductor switches 102 and 104 with freewheeling diodes 103, 105 associated therewith thus form a series circuit, which is connected in parallel with a series circuit formed by the semiconductor switches 109, 111 and the associated freewheeling diodes 110 and 112. An intermediate capacitor 106 is arranged in parallel with the two series circuits. The first connection X1 is arranged at a potential point 113 between the semiconductor switches 102, 104; the second connection X2 is arranged at a potential point 114 between the semiconductor switches 109, 111.

The voltage dropped across the terminals X1, X2 can be generated by suitable control of the power semiconductors 102, 104, 109 and 111, the voltage corresponding to the voltage Uc dropped across the intermediate capacitor 106, to the voltage dropped across the intermediate capacitor 106 but with the opposite polarity (−Uc) or to the voltage of zero.

The invention claimed is:

1. A converter configuration, comprising:
    a converter having a DC voltage side and a AC voltage side being connectable to an AC voltage grid;
    a storage configuration connected to said DC voltage side of said converter;
    said converter having a plurality of converter arms each having a series circuit of semiconductor switching modules;
    said storage configuration disposed in parallel with at least one of said converter arms, said storage configuration having first and second DC voltage bus bars and a plurality of storage branches each containing a series circuit of individual energy storage modules, each of said storage branches extending between said first and said second DC voltage busbars such that said storage branches are connected in parallel with one another, wherein individual ones of said energy storage modules having supercaps and/or battery stores; and
    a balancing configuration for balancing energy storage module voltages of said energy storage modules, said balancing configuration containing balancing lines connecting individual ones of said energy storage modules of different ones of said storage branches to one another, said balancing configuration being purely passive.

2. The converter configuration according to claim 1, wherein said balancing lines are dimensioned for compensation currents, the compensation currents, during operation of the converter configuration, can flow on account of capacitance differences between said energy storage modules of different ones of said storage branches.

3. The converter configuration according to claim 1, wherein an ordinal number can be assigned to each of said energy storage modules based on remaining ones of said energy storage modules of a same said series circuit and said balancing lines each connect said energy storage modules of a same ordinal number to one another.

4. The converter configuration according to claim 1, wherein each of said storage branches has a same number of said energy storage modules and a number of said balancing lines corresponds to a number of said energy storage modules in each of said storage branches.

5. The converter configuration according to claim 1, wherein a voltage of more than 1 kV can be generated at said energy storage modules.

6. The converter configuration according to claim 1, wherein said energy storage modules each have a positive and a negative connection terminal, wherein each of said balancing lines connects to said positive or said negative connection terminals of said energy storage modules.

7. The converter configuration according to claim 1, wherein said semiconductor switching modules have intermediate capacitors.

8. The converter configuration according to claim 1, wherein said semiconductor switching modules each contain semiconductor switches and an intermediate capacitor and are connected to one another in a full-bridge module circuit.

9. The converter configuration according to claim 1, further comprising a controller; and
    wherein the converter configuration is configured to exchange active power between said storage configuration and the AC voltage grid, an AC voltage side of the AC voltage grid is connected to the converter configuration, by suitable actuation of said semiconductor switching modules by means of said controller.

10. The converter configuration according to claim 1, further comprising a controller; and
    wherein the converter configuration is configured to exchange reactive power between said semiconductor switching modules and the AC voltage grid, an AC voltage side of the AC voltage grid is connected to the converter configuration, by suitable actuation of said semiconductor switching modules by means of said controller.

11. The converter configuration according to claim 1, wherein said converter arms of said converter are connected to one another in a double-star configuration.

* * * * *